United States Patent [19]

Dettmer et al.

[11] 4,397,905

[45] Aug. 9, 1983

[54] ADHESIVE TAPE

[75] Inventors: Gerhard Dettmer, Taunusstein; Peter Hammerschmidt, Wiesbaden, both of Fed. Rep. of Germany

[73] Assignee: Hoechst Aktiengesellschaft, Frankfurt am Main, Fed. Rep. of Germany

[21] Appl. No.: 204,863

[22] Filed: Nov. 7, 1980

[30] Foreign Application Priority Data

Nov. 8, 1979 [DE] Fed. Rep. of Germany ... 7931547[U]

[51] Int. Cl.[3] .................... B32B 3/28; A61F 13/02; C09U 7/02
[52] U.S. Cl. ...................................... 428/180; 428/40; 428/161; 428/178; 428/337; 428/343; 428/906; 428/910
[58] Field of Search ................. 428/906, 40, 343, 180, 428/141, 409, 178, 910, 337, 161, 165; 273/63 A, 75, 81 R, 81 B; 24/DIG. 11; 145/61 K, 61 C, 61 R; 16/116 R; 74/551.9

[56] References Cited

U.S. PATENT DOCUMENTS

| 853,094 | 5/1907 | Leitch | 24/DIG. 11 |
|---|---|---|---|
| 2,555,564 | 6/1951 | Berman | 428/343 |
| 3,036,945 | 5/1962 | Souza | 428/910 |
| 3,301,741 | 1/1967 | Jackson et al. | 428/161 |
| 3,346,105 | 10/1967 | Nye et al. | 428/40 |
| 3,489,031 | 1/1970 | Meier | 273/75 |
| 3,533,899 | 10/1970 | Kapral | 428/40 |
| 3,944,692 | 3/1976 | Swenson | 428/180 |
| 4,100,681 | 7/1978 | Hollands | 428/178 |
| 4,135,023 | 1/1979 | Lloyd et al. | 428/343 |
| 4,135,031 | 1/1979 | Akashi et al. | 428/900 |
| 4,139,669 | 2/1979 | Chang | 428/343 |
| 4,237,889 | 12/1980 | Gobran | 428/343 |

FOREIGN PATENT DOCUMENTS

| 50-13306 | of 1975 | Japan | 428/906 |
|---|---|---|---|
| 380088 | 9/1932 | United Kingdom | 273/81 R |
| 1005547 | 9/1965 | United Kingdom | . |
| 2057894A | 4/1981 | United Kingdom | 273/81 R |

Primary Examiner—William R. Dixon, Jr.
Attorney, Agent, or Firm—Schwartz, Jeffery, Schwaab, Mack, Blumenthal & Koch

[57] ABSTRACT

Disclosed is an adhesive tape comprising a support film of a synthetic thermoplastic polymer, preferably polyvinylchloride or polypropylene, and an adhesive layer on one side of it, wherein the support film has a thickness less than about 35 μm and preferably is stretch-oriented. Provided on the surface of the support film facing away from the adhesive layer are elevations having a depth within a range of from about 5 to 20 μm.

12 Claims, 2 Drawing Figures

ADHESIVE TAPE

BACKGROUND OF THE INVENTION

The present invention pertains to an adhesive tape and more particularly to an adhesive tape consisting of a support film in the form of an embossed strip of a synthetic thermoplastic polymer and an adhesive layer on one external side of the support film.

Adhesive tapes are produced by initially applying an adhesion promoting chemical substance on an external side of the support film and then applying to the surface of the support film prepared in this manner a layer of an adhesive.

The adhesion promoting base layer on the surface of the support film has the purpose of strongly anchoring the adhesive layer on the support, so that when the adhesive tape is wound into a multilayer roll in such a way that the outer side of the adhesive tape without the layer of adhesive forms the outer side of the roll, the adhesive layer of a winding is not destroyed during unwinding of the adhesive tape from the roll by its partial or complete transfer to the outer sides free of adhesive of the adjacent wound layers of the roll of adhesive tape.

In order to eliminate this disadvantage, it is customary to apply to the surface of the support film of the adhesive tape an anti-adhesive layer consisting of a chemical substance. During the winding of the adhesive tape into a roll, the adhesive force in the area of the roll layers adjacent to the phase interface is reduced by means of this layer to the extent that the adhesive tape will not break during its unwinding from the roll. With the use of this anti-adhesive layer, especially during rapid unwinding of the tape from the roll, e.g., for the production of smaller sized rolls, a disturbingly loud noise results which detrimentally affects the person working with the tape. Because of this anti-adhesive coating, it is not possible to print on the outer, adhesive-free side of the support film.

SUMMARY OF THE INVENTION

It is an object of the present invention to provide an improved adhesive tape.

In particular, it is an object of the present invention to provide an adhesive tape comprised of a support film and an adhesive layer applied to the external side of the support film, wherein the outer side of the support film free of adhesive may be printed on and may be unwound from the roll by means of a relatively slight force without damaging the adhesive layer of the adhesive tape.

It is a further object of the invention to provide such an adhesive tape wherein no disturbingly loud noise is generated during the rapid unwinding of the tape from a roll, e.g., for the purpose of producing smaller rolls.

In accomplishing the foregoing objects, there has been provided in accordance with the present invention an adhesive tape, comprising a support film of synthetic thermoplastic polymer having first and second sides and a thickness of less than about 35 $\mu$m and having on its first side a plurality of elevations having a height within the range of from about 5 to 20 $\mu$m; and a layer of adhesive on the second side of the support film. Preferably, the support film comprises on its second side a plurality of depressions equal and opposite to the elevations.

In one form of the invention, the adhesive tape comprises a roll having the first side of the support film facing the radial outside of the roll.

Further objects, features and advantages of the present invention will become apparent from the detailed description of preferred embodiments which follows, when considered together with the attached figures of drawing.

DETAILED DESCRIPTION OF PREFERRED EMBODIMENTS

Figure 1:
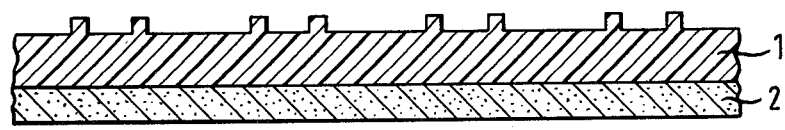
FIG. 1 is a schematic cross-sectional view of one embodiment of the adhesive tape according to the present invention.

The support film of the tape product according to the invention consists of a film of a synthetic, thermoplastic polymer preferably of polypropylene or polyvinylchloride, most preferably of polyvinylchloride, having a thickness of less than about 35 $\mu$m, preferably from about 25 to 30 $\mu$m. The support film is preferably oriented by stretching which takes place during its manufacture and is particularly advantageously stretch-oriented in a biaxial manner during the manufacturing process.

The support film has on at least one outer side a plurality of profiling elevations which are formed by embossing the film and are distributed uniformly over the entire length and width of the support film. All of the elevations are of the same depth, within a range of from about 5 to 20 $\mu$m.

In particular, the term an embossed film is intended to signify a film having a plurality of elevations on its outer side, corresponding to equal and opposing depressions on the other side of the film.

Between the elevations on one side of the film, and between the equal and opposing depressions on the other, flat areas of the film extend.

In a preferred embodiment of the invention, the support film of the invention therefore has a first external surface exhibiting exclusively elevations and a second external side surface having exclusively depressions, corresponding equally and opposingly to said elevations.

The adhesive layer is located on the external side of the support film of the adhesive tape which is not embossed, i.e., has only depressions. The surface of the film of the adhesive tape having exclusively elevations is not coated.

The product according to the invention is suitable for the formation of rolls of adhesive tape by winding, from which the adhesive tape may be unwound with the application of a relatively slight force without the generation of a disturbingly loud noise and without the adhesive layer of one winding of a roll of adhesive tape being transferred to the uncoated surface of the immediately adjacent layer of said roll of adhesive tape. It is also possible to print on the adhesive-free surface of the support film without difficulty.

The depth of embossing is defined as the vertical distance between the apex of an elevation and the plane of the base of said elevation. In this regard, with a planar orientation of the support, the base plane of the elevation corresponds to the plane in which the edge bordering the base surface of the elevation is contained.

The elevations are practically of the same height. Their apex surfaces are small compared with their base plane. The apex surfaces of the elevations have identical configurations and dimensions. The total surface area formed by the sum of all of the apex surfaces is small in relation to the total unembossed surface area of the support film.

The side of the support film exhibiting exclusively elevations is designated by way of definition as the positively structured side, and the other side, containing exclusively depressions is designated as the negatively structured side of the support film.

Figure 2:
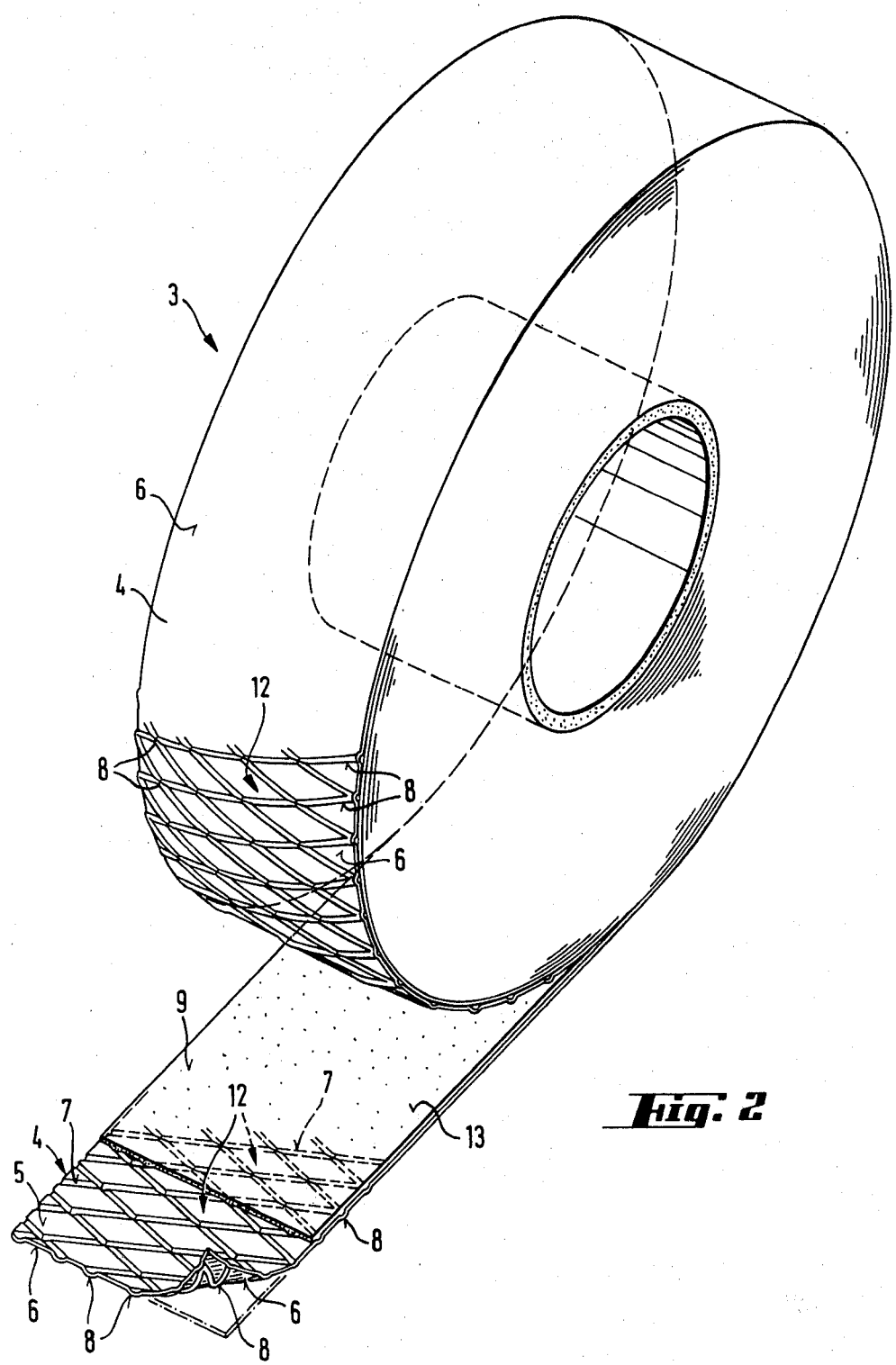
FIG. 2 is a perspective view, partially in section, illustrating a roll of another embodiment of the adhesive tape according to the invention.

The invention will now be further explained with reference to the drawings, which are illustrative of only several embodiments of the invention. FIG. 1 of the drawings represents one possible embodiment of the invention, wherein the support film of the adhesive tape is smooth on its side facing the adhesive layer and is provided with elevations on the other side. FIG. 2 illustrates another possible embodiment of the invention, wherein the support film of the adhesive tape has elevations on its side without the adhesive layer and has on the side covered with the adhesive layer depressions which are equal and opposite to the elevations.

In FIG. 1, the reference numeral 1 indicates the support film of the tape and reference numeral 2 the adhesive layer.

In FIG. 2, a wound adhesive tape roll 3 according to the invention comprises a support film 4 of the adhesive tape having an impressed side 5 and a raised side 6. Thus, groove-like impressions (depressions) 7 and bead-like protrusions (elevations) 8 equal and opposite to the depressions 7 are formed. The tape also includes an adhesive layer 9 applied to the side 5 of the support film having the depressions 7 and the diamond or rhomboid pattern 12 between the depressions. The side 13 of the adhesive layer 9 faces the raised surface 6 of the support film when the tape is rolled-up.

What is claimed is:
1. An adhesive tape, comprising:
a stretch-oriented and embossed support film of synthetic thermoplastic polymer having first and second sides and a thickness of less than about 35 μm and having on its first side a plurality of elevations formed by embossing the film and having a height within the range of from about 5 to 20 μm, and on its second side a plurality of depressions equal and opposite to said elevations; and
a layer of pressure-sensitive adhesive on the second side of said support film.

2. An adhesive tape according to claim 1, wherein said adhesive tape is in the form of a roll comprising a plurality of windings with the pressure-sensitive adhesive of each winding being in contact with and adhered to the first side of the support film of the adjacent winding.

3. An adhesive tape according to claim 1, wherein the support film is biaxially stretch-oriented.

4. An adhesive tape according to claim 3, wherein the stretch-oriented support film has a thickness of about 20 to 30 μm.

5. An adhesive tape according to claim 1, wherein the support film comprises polyvinylchloride or polypropylene.

6. An adhesive tape according to claim 1, wherein the support film comprises polyvinylchloride.

7. An adhesive tape according to claim 1, wherein the support film comprises polypropylene.

8. An adhesive tape according to claim 1, wherein said elevations form a diamond pattern.

9. An adhesive tape according to claim 1, comprising a roll of said adhesive tape having the first side of said support film facing the radial outside of the roll.

10. An adhesive tape according to claim 1, whereby said elevations and corresponding depressions form a plurality of hollow protrusions of flexible thermoplastic polymer extending out of the plane of the film.

11. An adhesive tape according to claim 1, wherein said first side of said support film forms one surface of the tape and said adhesive layer forms a substantially planar second surface of the tape.

12. An adhesive tape according to claim 1, wherein said adhesive layer comprises a smooth profile on the surface opposite said support film.

* * * * *